Nov. 22, 1966
A. N. ROGERS
3,287,169
FUEL CELL HAVING A HOLLOW FORAMINOUS ELECTRODE
Filed April 9, 1965
2 Sheets-Sheet 1
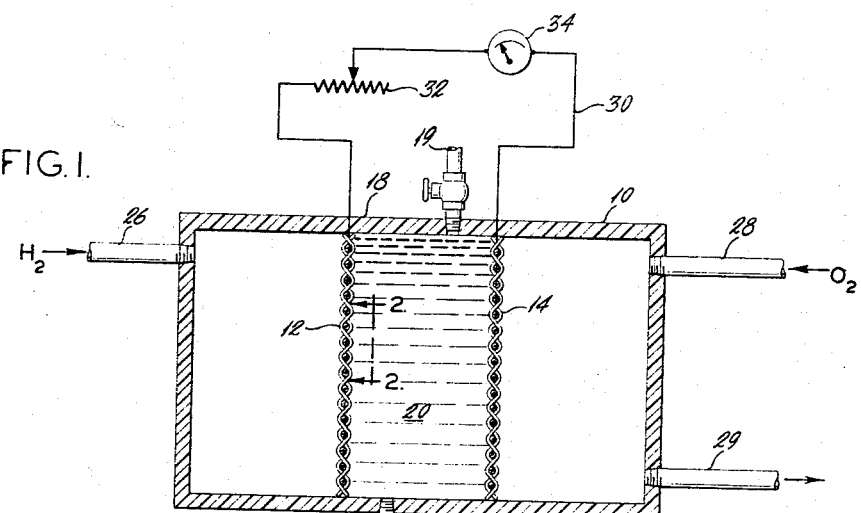
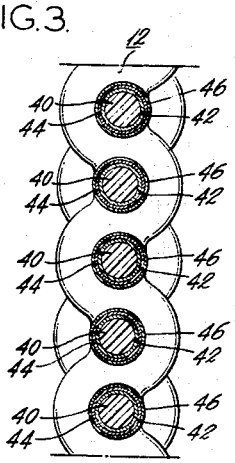
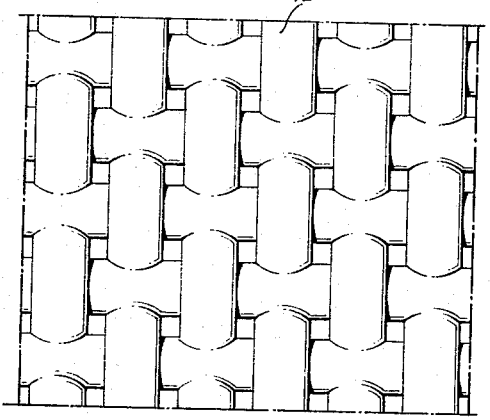
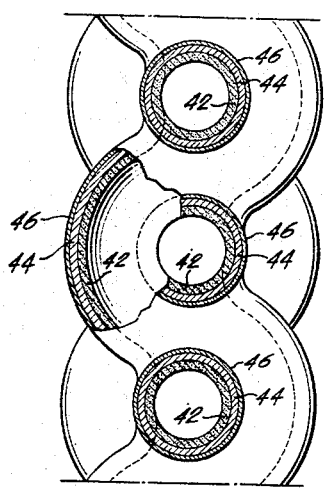
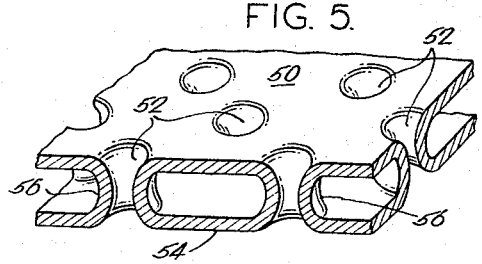
INVENTOR:
ALFRED N. ROGERS
BY
Howson & Howson
ATTYS Nov. 22, 1966

A. N. ROGERS 3,287,169

FUEL CELL HAVING A HOLLOW FORAMINOUS ELECTRODE

Filed April 9, 1965

INVENTOR:
ALFRED N. ROGERS
BY
Howson & Howson
ATTYS.

United States Patent Office 3,287,169
Patented Nov. 22, 1966

3,287,169
FUEL CELL HAVING A HOLLOW FORAMINOUS ELECTRODE
Alfred N. Rogers, Broomall, Pa., assignor to Baldwin-Lima-Hamilton Corporation, Philadelphia, Pa., a corporation of Pennsylvania
Filed Apr. 9, 1965, Ser. No. 446,960
8 Claims. (Cl. 136—86)

This application is a continuation-in-part of application Serial No. 209,616, filed July 13, 1962, now abandoned.

This invention relates to improvements in fuel cells, and more particularly to improvement in fuel cells using gas diffusion electrodes, and in electrodes of this type.

A fuel cell is a galvanic cell which converts the free energy of a fuel and oxidizing agent directly into electrical energy. In its simplest construction, a fuel cell consists of two electrodes, an anode and a cathode, between which there is a suitable ion-conducting electrolyte enclosed in a compartment of which two opposing walls are the electrodes which are electrically insulated from each other. The electrodes are porous so that the oxidizing gas and gaseous fuel may penetrate the cathode and anode, respectively, and have access to the reactive sites on the electrode surfaces which are in contact with the electrolyte. By electro-chemical reaction at such reactive sites, the net result, as for example in a hydrogen-oxygen cell, is the combination of hydrogen and oxygen to produce water with the generation of electrical current, which is withdrawn into an external electrical circuit.

Gas diffusion electrodes for fuel cells have in the past generally been formed of porous carbon or graphite, woven wire, such as stainless steel wire, or made from fine metal powders. These types of electrodes are extremely expensive. In addition, electrodes of porous graphite have the further disadvantage of being brittle and require the use of a strong bulky and expensive casing to prevent fracture of the electrodes.

In the operation of the known types of hydrogen-oxygen cells, for example, resistance losses under maximum output may result in production of sufficient heat to evaporate water. The water vapor so produced can contaminate the fuel gas resulting in loss in output capacity.

A primary object of this invention is to provide an improved fuel cell employing novel gas diffusion electrodes.

Another primary object of this invention is the provision of a novel gas diffusion electrode of relatively inexpensive construction which provides practical rates of electro-chemical reaction.

A further object of this invention is to provide a fuel cell capable of high rates of electro-chemical reaction and having low internal resistance and high efficiency.

Still another object of this invention is the provision of a novel electrode structure for reducing the overall cost of fabricating a fuel cell.

Another object of this invention is the provision of a novel electrode structure through which a cooling fluid can be circulated to maintain the fuel cell at optimum operating temperatures.

A still further object of this invention is a novel method for producing fuel cell gas diffusion electrodes in a relatively simple manner and at substantially reduced cost.

Still another object of this invention is a novel method for providing fluid cooling passages through the interior of a gas diffusion electrode to prevent the contamination of the fuel gas with water vapor.

These and other objects and many of the attendant advantages of this invention will be readily appreciated as the same become better understood by reference to the following detailed description thereof when considered in connection with the accompanying sheet of drawings wherein:

FIG. 1 depicts a sectional view of one embodiment of a fuel cell of the present invention;

FIG. 2 shows a foraminous, reticulated electrically conductive gas diffusion electrode of this invention;

FIG. 3 shows a fragmentary view in cross sectional elevation of a gas diffusion electrode of this invention at an intermediate step in its production, and FIG. 4 is a schematic enlargement depicting one form of a porous fuel cell electrode according to this invention.

FIG. 5 is a schematic enlargement of another form of electrode according to this invention.

Figure 6:
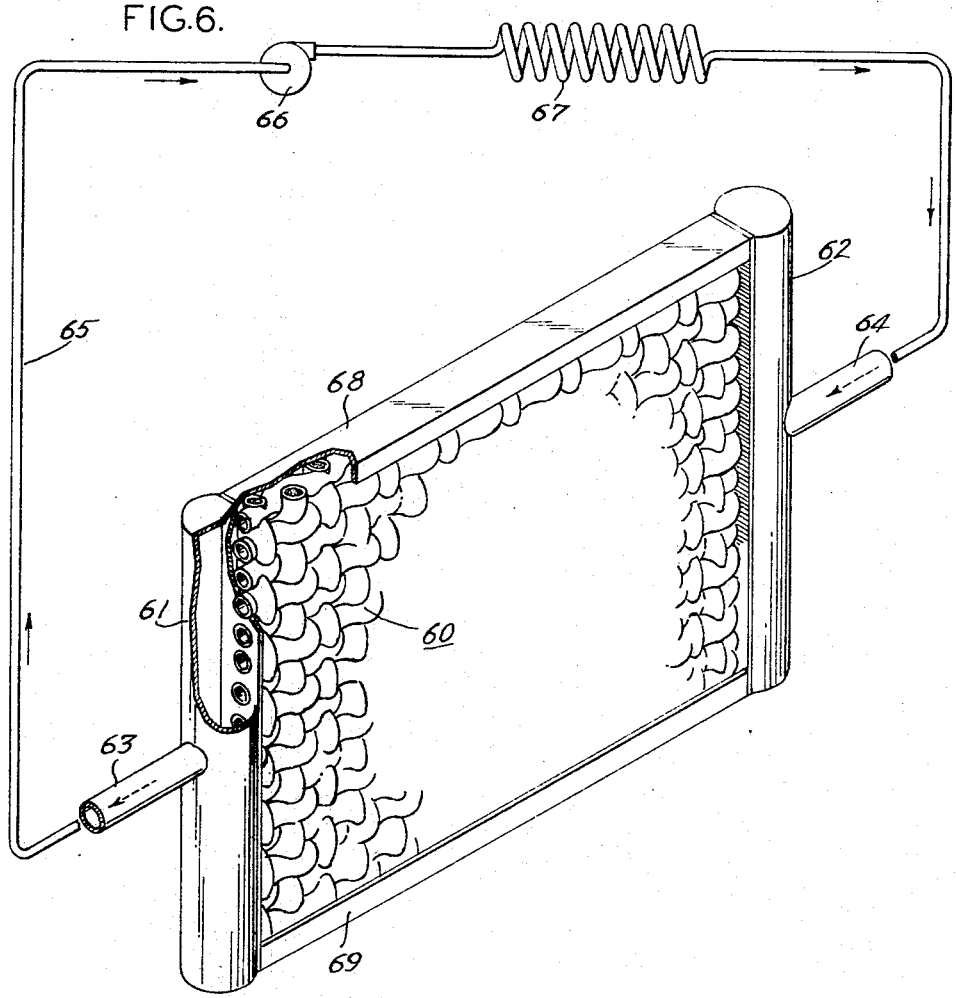
FIG. 6 is a perspective view of a preferred electrode configuration with attached manifold passages for the flow of a coolant through the electrode.

According to this invention there is provided a fuel cell comprising a casing containing an electrolyte and having separate oxidizing gas and fuel gas cavities separated from said electrolyte by gas diffusion electrodes, at least one of the electrodes comprising a substantially hollow sheet formed of spaced layers of an electrically conductive material selected from the group consisting of metals and metal alloys, the layers being joined at a plurality of points substantially uniformly distributed on the surface of the sheet, substantially all of the points of juncture being integral with the layers and being of substantially annular configuration thereby forming openings extending through the sheet. This invention also provides novel gas diffusion electrodes, and a method for making same.

According to a preferred embodiment of this invention, the hollow electrodes are provided with means for circulating a cooling fluid therethrough to control fuel cell temperature.

It was discovered that fuel cell electrodes having the advantageous properties of woven wire electrodes could be produced according to this invention at only a fraction of the cost of such woven wire electrodes. Similarly it was found that the desirable porous structure of electrodes produced by sintering fine metal powders could be produced at relatively low cost according to the invention. It was further discovered that the novel electrode structure of this invention make possible the circulation of a cooling fluid therethrough, by means of which the fuel cell temperature can be advantageously controlled. These and other advantages will become further apparent from a consideration of the following detailed description of the invention.

Referring to the drawings, there is disclosed in FIG. 1 a fuel cell embodying this invention which is operable at room temperature and atmospheric pressure or at elevated temperatures and/or pressures. The fuel cell comprises a hermetically sealed container or casing 10 of adequate strength for resisting any pressure that may be developed therein. Within the casing 10 and extending entirely transversely thereof is a pair of gas diffusion electrodes 12 and 14, respectively. These electrodes are in sealing engagement with, but electrically insulated from, the side walls, bottom 16 and top 18 of the container, whereby the container is divided into three separate chambers. Although the fuel cell in FIG. 1 has only three chambers, it can have a plurality of chambers, for example six oxidant gas and six fuel gas chambers arranged alternately and separated from each other by electrolyte. The electrodes comprise a foraminous sheet formed of substantially hollow strands of electrically conducting material and may have on the surface thereof a catalytic material, as more fully described hereinafter. The middle chamber 20 contains electrolyte, such as a 30% potassium hydroxide solution, and is provided with valved inlet and outlet connections 19 and 21, respectively. The left hand chamber 22 contains fuel gas, such as hydrogen, and the right hand chamber 24 contains oxidizing gas, such as oxygen or air. Chamber 22 is provided with a conduit 26 for supplying fuel gas under pressure thereto, and chamber 24 is provided with a conduit 28 for supplying an oxygen-containing gas thereto, and a conduit 29 for discharging impurities from the oxidant gas stream (e.g. nitrogen from an air supply).

Electrodes 12 and 14 are connected by means of an external electrical circuit 30 containing a variable resistance 32 and an ammeter 34.

Operation of the fuel cell illustrated in FIG. 1 is as follows:

Chamber 20 is filled with an electrolyte capable of conducting ions, as for example a 30% potassium hydroxide solution, by means of valved inlet connection 19. A fuel gas such as hydrogen is introduced under pressure to chamber 22 by means of conduit 26, and an oxidizing gas such as oxygen is supplied under pressure to chamber 24 by means of conduit 28. The electrolyte and the respective gases come into contact on the surface of the respective reticulated electrodes 12 and 14. When circuit 30 connects the two electrodes, direct generation of electrical current takes place with the formation of water as the overall electro-chemical reaction.

Cells of the type described with reference to FIG. 1 can operate at slightly above room temperature, e.g. 25° C., and atmospheric pressure or may be pressurized and operate at relatively high temperatures. The electrolyte may comprise a fused salt bath rather than an aqueous salt solution. Where the cell electrolyte comprises an aqueous solution, the electrode arrangement of FIG. 6, more fully described hereinafter, advantageously can be used with a circulated cooling fluid to control cell temperature.

Essential characteristics of the electrolytes for use in the fuel cells of this invention are that they neither be consumed nor permanently changed in service, that they not react with or corrode to any substantial extent the component parts of the cell, that they be not readily evaporated under cell operating conditions, and that they have good electrical conductivity. As examples of various aqueous electrolytes that can be employed to advantage there may be mentioned strong bases which produce a large number of hydroxyl ions, particularly the alkali metal hydroxides such as lithium hydroxide, potassium hydroxide and sodium hydroxide. Among the acid electrolytes may be mentioned aqueous solutions of sulfuric and hydrochloric acid.

Suitable fused salt electrolytes are the carbonates, particularly the alkali and alkaline earth metal carbonates. Mixtures of different carbonates and of carbonates with other salts, such as alkali and alkaline earth metal halides, may be used. In addition, the halide salts can be used by themselves.

Gaseous fuels which may be employed in the fuel cell of this invention include hydrogen, carbon monoxide, methane, ethane, propane, butane, iso-butane, water gas, producer gas, illuminating gas and natural gas. Gaseous products of partial combustion of liquid fuels, such as petroleum and solid fuels such as coal may also be used.

The oxidizing gas may comprise oxygen itself or oxygen mixed with other gaseous constituents, e.g. air. Chlorine or other oxidizing gas may also be used.

As stated previously, the fuel cells of this invention involve the use of novel gas diffusion electrodes of relatively inexpensive construction.

Referring to FIGS. 2 and 4 there is illustrated a preferred form of gas diffusion electrode according to this invention comprising a fabric of plain weave. The fabric consists of hollow strands formed of a plurality of layers of different material, the strands being joined at their points of intersection. More particularly the hollow strands comprise a layer of electrically conductive material 42, as for example powdered graphite or conductive metal; on top of the layer 42 of powdered graphite or other electrically conductive material a layer of conductive metal or metal alloy 44, such as nickel, and over the electrically conductive metal layer 44 a layer 46 of a material for catalyzing an electro-chemical reaction, such as platinum.

Turning now to a more detailed consideration of the process by means of which the electrodes of this invention, such as illustrated in FIGS. 2 and 4, may be formed, there is employed a relatively non-conductive substrate, preferably a woven fabric which may be of any suitable weave, such as plain, leno, basket, etc. (see 40 of FIG. 3). The fibers from which the fabric is made are preferably organic, such as cotton or linen or of a synthetic organic material such as a polyester (Dacron) or polypropylene resin, so that they may be readily removed, as hereinafter described. Although organic fibers are preferred because of their ease of removal, the fabric may comprise inorganic fibers such as glass or asbestos fibers. The fabrics may be woven from monofilaments, spun yarns and the like. Non-woven fabrics and porous papers may be used, however, woven fabrics of organic fibers are preferred.

The foraminous, preferably reticulated or woven, relatively non-conductive substrates preferably have an average pore diameter of from about 0.1 to about 4 microns.

Typical examples of relatively non-conductive substrates for producing electrodes according to this invention are set forth in Table I, below:

Table I

|  | A | B | C | D |
|---|---|---|---|---|
| Weave type | Plain | Plain | Plain | Basket. |
| Fiber type | Polyester | Polyester | Polyester | Polypropylene.[1] |
| Warp count | 49 | 40 | 42 | 100. |
| Fill count | 28 | 37 | 44 | 19. |
| Warp thread [2] | 12½ 3 ply | 6¼ single | 12½ 2 single | (3). |
| Fill thread [2] | 12½ 3 ply | 7 single | 12½ single | (4). |
| Fabric thickness | 35.3 mils | 22 mils | 14.3 mils | 0.021″. |
| Wt./sq. yd | 14.73 oz | 10 oz |  | 8.96 oz. |

[1] Calendered.
[2] Cotton count.
[3] 2 threads side by side, 375 denier.
[4] 1,200 denier, consisting of 24 monofilaments.

In order to render the substantially non-conductive substrate electrically conductive, there is deposited on the surface of the fibers forming the substrate an electrically conductive material which may be in powder form. Representative examples of suitable electrically conductive powders are graphite, and metals such as copper, brass, silver, etc. Rendering the substrate electrically conductive can also be accomplished without the use of powders, as for example by applying a metal coating by other methods, such as the well known electroless nickel or the reduced silver methods. Where the relatively non-conductive substrate is formed of smooth monofilaments, it may be desirable to roughen the surface thereof prior to application of conductive powder.

For example, polyester (Dacron) monofilaments may be roughened by immersion in (a) strong, hot caustic solution, or (b) boiling m-cresol. Polypropylene monofilaments may be roughened or etched by (a) a short treatment in strong, hot chromic acid solution or (b) a high-voltage corona discharge in air.

The particle size of the electrically conductive particles is not critical; however, it is important that sufficient particles be applied to the surface of the substrate to insure that a substantial portion of the particles are in electrical contact with their neighbors, otherwise electrical conductivity of the substrate will be too low. Generally, the particles of electrically conductive material will be from about 0.5 to about 150 microns in effective size. The "effective size" refers to agglomerates formed of several particles as well as ultimate particles, depending upon the particular material. For example, in graphite suspensions of the type hereinafter referred to, the ultimate particles are a small fraction of a micron in diameter; however, these particles tend to agglomerate into clusters having an effective diameter of the order of several microns.

In order to effect adherence of the particles of electrically conductive material to the fibers of the substrate, resort may be made to the use of suitable binders which do not interfere with subsequent application of conductive metal coating 44 (see FIG. 3) to the fibers. Typical coating compositions include dispersions of finely divided graphite in aqueous sodium silicate binder, graphite-containing printing inks, and lacquers containing a relatively high concentration of powdered metal in suspension. In addition, a clear lacquer or shellac may be applied to the substrate fibers and graphite or metal particles may be dusted thereon while the binder is in a tacky condition. Particularly good results may generally be obtained by applying the electrically conductive powders in a number of successive treatments, as by dipping the substrate several times in the coating compositions, drying between coats. A particularly preferred method for rendering polypropylene fibers electrically conductive comprises sensitizing the surface of the fibers with a stannous chloride solution, followed immediately by spraying silver on the sensitized fibers. Such silver spraying is commonly performed by spraying, simultaneously, an aqueous solution of silver nitrate (roughly between about 1% and 5% concentration) from one spray gun and an aqueous solution of sodium hypophosphite (roughly between 1% and 5% concentration) from another gun located nearby. The two guns are so directed that their streams intermingle approximately six inches prior to striking the target material, on which a continuous, conductive layer of silver is deposited almost instantly.

To provide the novel electrodes of this invention the substrate, after being rendered electrically conductive as described above, is coated with an electrically conductive metal. Any metal or metal alloy, preferably one of high electrical conductivity, may be used, however nickel is preferred because in addition to having adequate electrical conductivity, it is resistant to attack by caustic solutions and dilute mineral acids frequently employed as electrolytes in fuel cells, and because it appears to have no detrimental effect on the catalytic action of the noble metal catalysts which may subsequently be coated thereover, as hereinafter described.

Nickel or other metal or metal alloy may be plated on the fibers by means of any suitable electroplating bath well known to those familiar with the electroplating art. For example, nickel may be plated from a conventional Watts bath, pH 4.5, temperature 150° F., cathode current density 120 a.s.f., anodes pure nickel, plating time about 30 minutes. The bath may contain a wetting agent, and preferably is moderately agitated during the plating operation.

The plating operation should be continued until the substrate has a sufficient coating of metal to have the desired strength and electrical conductivity. The thickness of the coating ordinarily will be from about 0.5 to about 12 mils, 2 to 10 mils being preferred. The coating, however, should not be so thick as to completely fill the pore between the fibers, or so thin as to have inadequate strength during assembly and use of the fuel cell in which the electrode is used after removal of the non-conductive substrate.

The form of the electrode according to this invention will to a large measure depend on the construction of the non-conductive substrate, woven, non-woven, etc., and on the amount of conductive metal deposited on the substrate. Referring to FIG. 5, regardless of the structure of the non-conductive substrate, if the thickness of the conductive coating is as specified in the preceding paragraph, the electrode, after removal of the substrate, will generally comprise a substantially hollow sheet 50 formed of spaced layers 52 and 54 of electrically conductive material joined at a plurality of points 56 substantially uniformly distributed on the surface of the sheet. Each such point of juncture will be integral with the respective layers, i.e. it will form a continuous bridge between the layers so that the sheet is essentially a single continuous piece of conductive material. Each point of juncture will also be of substantially annular or tubular configuration so as to provide a plurality of openings entirely through the sheet.

When the non-conductive substrate is in the form of a woven cloth, and a relatively heavy coating of conductive material is applied thereto, the resulting electrode, after removal of the substrate, will tend to be in the form of hollow strands of conductive material joined at their points of intersection, with openings between strands extending entirely through the electrode. In this connection see FIG. 4.

As pointed out above, heat generated by high resistance losses under maximum output can elevate the temperature of a fuel cell using an aqueous electrolyte to the point where substantial evaporation of electrolyte takes place. The resultant water vapor can contaminate the fuel gas with loss in cell output capacity. The novel fuel cell electrode structure of this invention advantageously is adopted for circulation of a cooling fluid therethrough to control cell temperature and prevent fuel gas contamination with water vapor. The fuel cell electrode structure of FIG. 6 is especially designed for cell temperature control.

Referring to FIG. 6, there is shown an electrode 60 with tubular manifolds 61 and 62 located along its opposite side edges. The electrode 60 has the hollow structure described above and as particularly illustrated in FIGS. 4 and 5. Manifolds 61 and 62 are provided with suitable fluid coolant connections 63 and 64, respectively, for electrically insulating pipe 65. Connected to pipe 65 are pump means 66 and cooling means 67 for circulating and cooling the fluid coolant. The openings in the upper and lower opposing edges of the electrode 60 may be sealed by soldering or by attachment thereto of sealing strips 68 and 69. The coolant preferably is an electrically non-conductive liquid or gas having neutral effect on the cell operation, such as air. The electrolyte can also be used as the coolant by electrically insulating the heat exchanger.

Referring to FIG. 1, the fuel cell electrodes 12 and 14 may have the structure illustrated in FIG. 6 and described above. Each electrode may be provided with means for circulating the cooling fluid including pump means 66 and cooling means 67. In operation a cooling fluid, such as distilled water, is circulated through the electrode to control cell temperature thereby preventing fuel gas contamination with water vapor.

The openings or capillaries extending through the electrode sheet ordinarily will have an average diameter of from about 0.1 to about 4 microns. The catalyst coating hereafter discussed is relatively minute in thickness and has no particular effect on the pore size. Preferably, the pore size is in the range between about 0.2 and about 0.8 microns.

Although the above described procedure for forming the electrically conductive structure of the novel gas diffusion electrodes of this invention is preferred, other methods may be employed. For example, the relatively non-conductive fibrous substrate may have an electrically conductive metal coating applied thereto by the well known "electroless" plating method. A typical example involving the use of a substrate comprising polypropylene fibers consisting of immersing the substrate in a solution of stannnous chloride hydrate, followed by a water rinse and removal of excess water, then immersing the substrate in a palladium chloride bath containing a suitable wetting agent. The substrate, after a water wash and removal of excess water, is transferred to a nickel bath to which has been added nickel chloride hexahydrate, monosodium hypophosphite monohydrate, hydroxyacetic acid and sodium hydroxide, pH about 4, temperature about 90–100° C. After about 2–3 hours in the latter bath a suitable nickel coating is obtained.

Other methods for applying the electrically conductive coating include such well known procedures as a vacuum metallizing, decomposition of metal carbonyls, and the use of the Brashear or Rochelle salt methods for silver reduction.

Where the metal coating is produced by methods not involving electroplating, the rendering of the substrate electrically conductive by means of graphite or metal particles may be omitted. In some instances the various methods for applying the metal coating may be combined. For example, the substrate may be rendered electrically conductive by electroless plating, vacuum metallization, etc. Thereafter, the metal coating could be applied by electroplating. Other variations will be readily apparent to those skilled in the art.

On the surface of the metal coated substrate there is preferably applied a coating of a suitable metal for catalyzing the electro-chemical reactions taking place in the fuel cell. For the fuel electrode, or anode, the metals platinum and palladium are particularly useful. For the oxidizing gas electrode, or cathode, suitable catalysts include platinum, gold, silver, copper and iron. The catalyst metal coating may be applied by any of the above techniques for applying the metal coating. For example, platinum may be deposited electrolytically from the well known complex ammonium phosphate bath. Various methods of applying the catalyst metal coating will be apparent to those skilled in the metal plating art.

The catalyst metal coating is relatively thin, generally of the order of from about 1 atom to about 20 atoms in thickness, although thicker coatings have not been found to be detrimental. The catalyst is preferably in a very fine state of subdivision. For example, platinum black on the fuel electrode is especially advantageous, as prepared by electro-deposition from an aqueous 1% chloroplatinic acid solution containing a trace of lead acetate.

According to this invention the relatively non-conductive substrate is removed by a suitable physical or chemical treatment, in order to prevent subsequent decomposition or corrosion by the electrolyte to be used in the subject fuel cell, and to prevent any resulting contamination of the electrolyte and the possible interference with the free capillary actions required of the porous electrodes. Methods of removing the non-conductive substrate will depend upon the composition thereof, and are well known to persons skilled in the art. Physical treatments include dissolving the substrate in a suitable solvent, heating the structure to thermally decompose the substrate and volatilize the decomposition products, etc. Chemical treatments include the use of reagents which react with the substrate to solubilize it, etc. For example, polymethylmethacrylate fibers and porous sheets may be decomposed by heat into volatile products. Dacron and cotton can be leached out completely by prolonged treatment with concentrated sodium or potassium hydroxide.

The following examples further illustrate the invention.

EXAMPLE I

Polyester (Dacron) fabric A of Table I was immersed in a graphite dispersion containing 5% finely divided graphite, 3% of a mixture of sodium and potassium silicates and balance water (impurities less than 0.3%), removed therefrom and dried. The process was repeated three additional times.

The fabric, coated with fine particles of graphite, was placed in a standard nickel plating bath containing 330 g./l. of nickel sulfate hexahydrate, 45 g./l. of nickel chloride hexahydrate, and 38 g./l. of boric acid. The temperature of the bath was about 85° F. and the pH thereof was about 5. The fabric was made the cathode and the anode was of grade A nickel.

A nickel strike was obtained in about 90 seconds using 24 volts. Plating of nickel was accomplished in about thirty minutes after a current density of 0.6–0.7 amps per square inch obtained by decreasing the voltage from 22 to 12.5 volts. The average thickness of the nickel coating was about 2 mils.

Immediately after applying the nickel coating, the structure was rinsed in water and then plated with platinum using a platinum plating solution containing 56 g./l. of ammonium monohydrogen phosphate and 10 g./l. of hydrochloroplatinic acid hexahydrate (prior to use this solution was boiled until its color changed from orange to pale yellow, indicating the formation of a complex platinum phosphate, pH of 7). The plating temperature was 90° C., the current density 9.4 a.s.f., the plating time one minute. The plating anode was platinum (insoluble). The nickel was substantially completely covered with platinum metal.

The polyester fabric, plated as above, was suspended in a 25% solution of sodium hydroxide maintained at 200–210° F. for a period of 3–4 days to leach out the polyester substrate. The leaching action was accelerated by slowly circulating the liquid around the plated fabric.

EXAMPLE II

A fuel cell was constructed having six anodes and six cathodes formed according to Example I arranged alternately to form a battery of six complete cells spaced alternately. Manifolds for hydrogen, oxygen and a 30% potassium hydroxide solution were arranged with lateral passages to provide ingress and egress of the gases and electrolyte to their respective chambers in the battery. Each cell was connected in series to the next and the battery was connected to an outside circuit. The temperature of the cell was maintained in the range between about 50° and 60° C. while the pressure was varied from about atmospheric to about 6 p.s.i.g.

The efficiency of the cell, based on voltage output, was 81%.

EXAMPLE III

The procedure of Example I is repeated with the exception that a cotton cloth of fiber size, weave, etc. comparable to the polyester cloth is used.

EXAMPLE IV

The procedure of Example I is repeated with the exception that a polymethylmethacrylate cloth of fiber size, weave, etc., comparable to the polyester cloth is used, and the cloth is removed by thermal decomposition.

EXAMPLE V

The procedure of Example I is repeated using a polypropylene cloth which is removed by thermal decomposition.

What is claimed is:

1. A fuel cell comprising a casing containing an electrolyte and having separate oxidizing gas and fuel gas cavities separated from said electrolyte by gas diffusion electrodes, at least one of said electrodes comprising a foraminous body formed of substantially hollow strands of an electrically conductive material selected from the group consisting of metals and metal alloys united at their points of contact, means for introducing a coolant fluid to the interior of said hollow strands of said electrode, means for withdrawing coolant fluid from said hollow strands, and means for circulating said fluid coolant between cooling means for said coolant fluid and said electrode.

2. A fuel cell according to claim 1 in which said electrode has a coating of a material which catalyzes an electrochemical reaction.

3. A fuel cell according to claim 1 in which said substantially hollow strands of said electrode comprise nickel and have superimposed thereon a coating of platinum.

4. A fuel cell according to claim 1 in which said substantially hollow strands of said electrode comprise nickel and have superimposed thereon a coating of silver.

5. A fuel cell comprising a casing containing an electrolyte and having separate oxidizing gas and fuel gas cavities separated from said electrolyte by gas diffusion electrodes, at least one of said electrodes comprising a substantially hollow sheet formed of spaced layers of an electrically conductive material selected from the group consisting of metals and metal alloys, said layers being joined at a plurality of points substantially uniformly distributed on the surface of said sheet, substantially all of said points of juncture being integral with said layers and being of substantially annular configuration thereby forming openings extending entirely through said sheet, means for introducing a coolant fluid to the interior of said hollow electrode, means for withdrawing coolant fluid from said hollow electrode, and means for circulating fluid coolant between cooling means for said fluid coolant and said hollow electrode.

6. A fuel cell according to claim 5 in which said electrode has a coating of a material which catalyzes an electro-chemical reaction.

7. A fuel cell according to claim 5 in which said electrode comprising a substantially hollow sheet is formed of nickel and has superimposed thereon a coating of platinum.

8. A fuel cell according to claim 5 in which said electrode comprising a substantially hollow sheet is formed of nickel and has superimposed thereon a coating of silver.

References Cited by the Examiner

UNITED STATES PATENTS

| | | | |
|---|---|---|---|
| 666,321 | 1/1901 | Langhams | 204—9 X |
| 1,014,603 | 1/1912 | McPhayden | 204—9 |
| 1,575,915 | 3/1926 | Hart | 204—9 |
| 2,756,201 | 7/1956 | Muller | 204—274 X |
| 2,834,690 | 5/1958 | Marvin | 22—1 X |
| 3,087,233 | 4/1963 | Turnbull. | |
| 3,097,974 | 7/1963 | McEvoy et al. | 136—86 |
| 3,121,925 | 2/1964 | Toulmin | 22—200 X |
| 3,150,998 | 9/1964 | Reitemeier | 136—86 |

FOREIGN PATENTS

| | | |
|---|---|---|
| 5,691 | 1910 | Great Britain. |
| 797,678 | 7/1958 | Great Britain. |

WINSTON A. DOUGLAS, *Primary Examiner.*

ALLEN B. CURTIS, *Examiner.*